Feb. 14, 1956 — D. W. HENSLEY — 2,734,727
CLEAN ROW FENCE POST
Filed Sept. 22, 1953

INVENTOR.
Dolphus W. Hensley
BY
McMorrow, Berman & Davidson
ATTORNEYS

United States Patent Office 2,734,727
Patented Feb. 14, 1956

2,734,727

CLEAN ROW FENCE POST

Dolphus W. Hensley, Rosebud, Mo.

Application September 22, 1953, Serial No. 381,607

1 Claim. (Cl. 256—48)

This invention relates to fences, and more particularly to an improvement in posts for wire fences.

The main object of the invention is to provide a novel and improved fence post for supporting spaced fence wires, said post being simple in construction, being easy to install in the ground, and providing a stable support for the fence wires, as well as providing clearance for mowing grass closely adjacent to the fence.

A further object of the invention is to provide an improved fence post for supporting spaced fence wires, said fence post being inexpensive to fabricate, being sturdy in construction, and being arranged so that ample clearance is provided adjacent the fence for the movement of a mowing machine, field mower, or similar implement close to the fence.

Further objects and advantages of the invention will become apparent from the following description and claim, and from the accompanying drawings, wherein:

Figure 1:
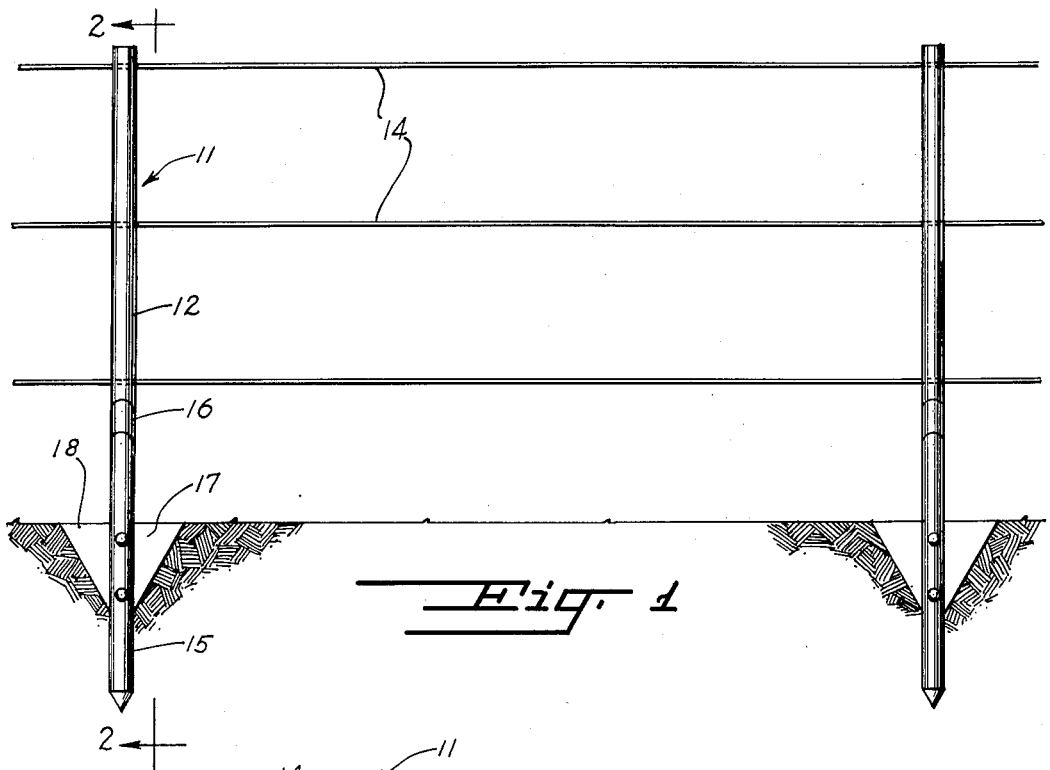
Figure 1 is an elevational view of a portion of a wire fence employing improved fence posts constructed in accordance with the present invention.
Figure 2:
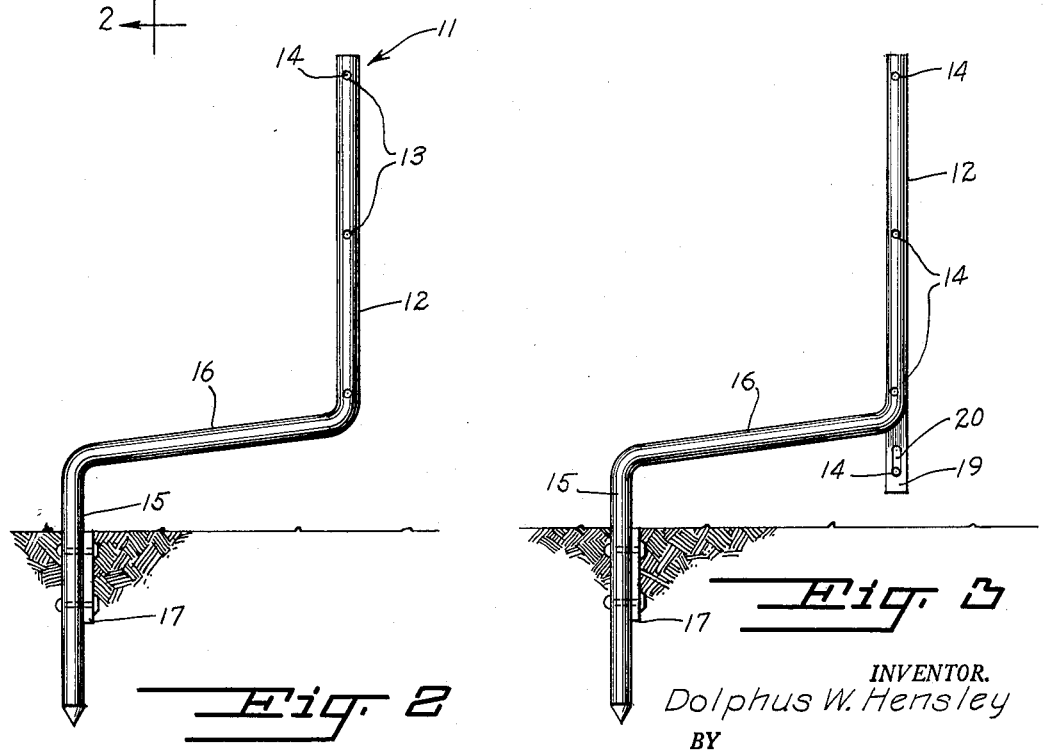
Figure 2 is a side elevational view of one of the fence posts of Figure 1, said view being taken on the line 2—2 of Figure 1.

Referring to the drawings, and more particularly to Figures 1 and 2, 11 designates generally a fence post according to the present invention. The fence post 11 comprises a rigid elongated main body 12 which may be formed of suitable stock, the main body 12 being formed with the vertically spaced apertures 13 to receive the vertically spaced fence wires 14. Designated at 15 is a relatively short, pointed, ground-engaging stake which is arranged parallel to and offset from the main body 13, and which is integrally connected to the lower end of the main body 12 by the straight element 16, said element 16 extending at obtuse angles to both the main body 12 and the stake element 15, as is clearly shown in Figure 2, whereby the straight connecting element 16 is inclined upwardly from the top end of the stake element 15 toward the lower end of the main body 12. As is clearly shown in Figure 2, the length of the connecting element 16 may be of the same order as the length of the stake element 15, whereby the main body 12 is offset a substantial distance from the stake element 15.

Rigidly secured to the intermediate portion of the stake element 15 is the rigid plate member 17, said plate member extending in a plane normal to the plane of the main body 12 and the stake element 15. The plate member 17 is in the form of an isosceles triangle having its top edge 18 normal to the stake element 15, the plate member 17 being secured to the stake element 15 at its vertical median line.

As is clearly shown in Figure 1, when the fence post is installed in the ground, the plate member 17 is substantially entirely embedded in the ground and the top edge 18 of said plate member is substantially flush with ground level. The plate member 17 serves to stabilize the fence post 11 against forces tending to rotate the fence post either around a vertical axis or around a horizontal axis normal to the plane defined by the main body 12 and the stake element 15.

As is clearly shown in Figure 1, the fence wires 14 extend through the vertically spaced apertures 13 of the main body 12 and are thus supported in vertically spaced horizontal positions.

As is clearly shown in Figure 2, the main body 12 is supported with the lower end thereof a substantial distance above ground level, whereby a mowing machine, field mower or similar implement may be moved closely adjacent to and beneath the fence wires 14, allowing the area to be easily mowed.

The main purpose of the post of the present invention above described is to facilitate efficient and easy cleaning of all weeds or grass from the fence row by the use of a mowing machine or field mower, thus eliminating hand work in cutting along the fence row and around posts. This is especially important where a charged wire electric fence is employed.

Figure 3:
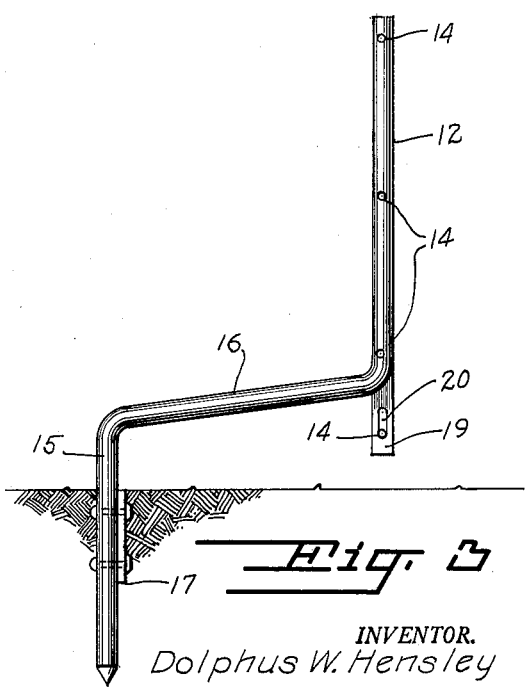
Figure 3 is a side elevational view similar to Figure 2 but showing a modified form of fence post in accordance with the present invention.

Referring now to the form of the invention in Figure 3, the main body 12 of the fence post may be provided with a depending apertured lug 19 which is aligned with the main body 12, as is clearly shown in Figure 3, the aperture 20 of the lug serving to receive an additional fence wire 14, when it is desired to provide such an additional fence wire close to the ground, for example, for preventing small animals from escaping through the fence.

The post structures above described are suitable for any type of fence but are primarily intended for field fencing.

While certain specific embodiments of an improved fence post have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a fence post comprising a rigid elongated main body adapted to be secured to vertically spaced horizontal fence wires, a relatively short, ground-engaging pointed stake element parallel to and offset from said main body, a straight element rigidly connecting said stake element to the lower end of said main body, said straight element comprising a member integral with said main body and said stake element and extending at obtuse angles thereto, and a rigid plate element rigidly secured to the intermediate portion of said stake element and extending in a plane normal to the plane of said main body and stake element, said plate element having its top edge extending normal to said stake element, the improvement comprising an apertured lug aligned with and depending from said main body below said straight element, said apertured lug being adapted to receive an auxiliary fence wire to support said auxiliary fence wire close to the ground for preventing small animals from passing thereunder.

References Cited in the file of this patent

UNITED STATES PATENTS

| | | |
|---|---|---|
| D. 31,091 | Handley | June 27, 1899 |
| 697,259 | Lavely | Apr. 8, 1902 |
| 1,637,645 | Jones | Aug. 2, 1927 |
| 1,964,404 | Lynch | June 26, 1934 |
| 2,351,261 | Hall | June 13, 1944 |